United States Patent
Kim et al.

(10) Patent No.: US 7,787,336 B2
(45) Date of Patent: Aug. 31, 2010

(54) APPARATUS AND METHOD OF PROCESSING SIGNALS OF AN OPTICAL DISK RECORDING/REPRODUCING APPARATUS

(75) Inventors: Soo-yong Kim, Suwon-si (KR); Young-hoon Lee, Seoul (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 931 days.

(21) Appl. No.: 11/516,706

(22) Filed: Sep. 7, 2006

(65) Prior Publication Data

US 2007/0055720 A1 Mar. 8, 2007

(30) Foreign Application Priority Data

Sep. 8, 2005 (KR) .................. 10-2005-0083580

(51) Int. Cl.
*G11B 5/00* (2006.01)

(52) U.S. Cl. .............. 369/47.54; 369/47.35; 369/47.39; 369/59.19; 369/59.21

(58) Field of Classification Search .............. 369/59.27, 369/59.19, 5, 103, 47.2, 47.54, 47.35, 47.39, 369/59.21, 53.22, 44.34; 360/46; 455/3.05; 710/260; 326/9
See application file for complete search history.

(56) References Cited

U.S. PATENT DOCUMENTS

| 5,497,502 | A | * | 3/1996 | Castille | 455/3.05 |
| 5,668,785 | A | * | 9/1997 | Monta | 369/5 |
| 5,875,158 | A | * | 2/1999 | Schell | 369/44.34 |
| 6,052,244 | A | * | 4/2000 | Haraguchi et al. | 360/46 |
| 6,112,273 | A | * | 8/2000 | Kau et al. | 710/260 |
| 6,266,306 | B1 | * | 7/2001 | Schell et al. | 369/44.34 |
| 6,418,097 | B1 | * | 7/2002 | Schell et al. | 369/44.34 |
| 6,895,348 | B2 | | 5/2005 | Kawabe et al. | |
| 7,145,858 | B2 | * | 12/2006 | Lee et al. | 369/59.19 |
| 7,233,551 | B2 | * | 6/2007 | Abe et al. | 369/47.2 |
| 7,235,999 | B2 | * | 6/2007 | Goetting et al. | 326/9 |
| 7,376,068 | B1 | * | 5/2008 | Khoury | 369/103 |
| 2002/0018422 | A1 | | 2/2002 | Tonami | |
| 2002/0080707 | A1 | * | 6/2002 | Abe et al. | 369/59.27 |
| 2004/0172148 | A1 | | 9/2004 | Horibe | |
| 2004/0196765 | A1 | * | 10/2004 | Mair et al. | 369/53.22 |
| 2004/0252395 | A1 | | 12/2004 | Elliott et al. | |
| 2005/0141384 | A1 | * | 6/2005 | Lee et al. | 369/59.19 |

FOREIGN PATENT DOCUMENTS

| JP | 10-320940 | 12/1998 |
| JP | 2004-342264 | 12/2004 |
| KR | 2004-0048250 | 6/2004 |

* cited by examiner

*Primary Examiner*—Thuy N Pardo
(74) *Attorney, Agent, or Firm*—Lee & Morse, P.C.

(57) ABSTRACT

A signal processing apparatus of an optical disk recording/reproducing apparatus and a signal processing method performed thereby are provided. The signal processing apparatus may include an operational data generation unit for receiving digital signals, filtering received digital signals and outputting filtered signals as operational data and a data arithmetic-operation unit for performing an arithmetic operation on the operational data output by the operational data generation unit in response to a command.

17 Claims, 4 Drawing Sheets

APPARATUS AND METHOD OF PROCESSING SIGNALS OF AN OPTICAL DISK RECORDING/REPRODUCING APPARATUS

BACKGROUND OF THE INVENTION

1. Field of the Invention

The present invention relates to an optical disc reproducing/recording apparatus. More particularly, the present invention relates to a signal processing apparatus for an optical disk recording/reproducing apparatus that includes a digital filter implemented as hardware, and a signal processing method performed by the signal processing apparatus.

2. Description of the Related Art

General optical disk recording/reproducing apparatuses measure signals during a predetermined cycle, sample the measured signals, and carry out an arithmetic operation on the sampled signals. Typically, automatic adjustment of a servo signal or motor control is performed using the results of the arithmetic operation.

The sampling and the arithmetic operation are typically implemented in a software fashion. That is, general optical disk recording/reproducing apparatuses include a micro-controller unit (MCU) to carry out sampling and arithmetic operation on the measured signals. However, the sampling and arithmetic operation by an MCU may have at least the following problems.

First, if a sampling frequency increases, the number of measured signals increases, complicating the arithmetic operation. Thus, the MCU must perform an increasing amount of arithmetic operations.

Second, a great number of source codes are needed to implement the MCU in a software fashion. Thus, general optical disk recording/reproducing apparatuses should include a large memory.

Third, while the MCU is sampling the measured signal during a specific period of time, it cannot perform other operations.

SUMMARY OF THE INVENTION

The present invention is therefore directed to a signal processing apparatus and method, which substantially overcome one or more of the problems due to the limitations and disadvantages of the related art.

It is therefore a feature of an embodiment of the present invention to provide a signal processing apparatus including a digital filter implemented as hardware, the signal processing apparatus included in an optical disk recording/reproducing apparatus.

It is therefore a feature of an embodiment of the present invention to provide a signal processing method including a digital filtering operation implemented as hardware, the signal processing method performed in an optical disk recording/reproducing apparatus At least one of the above and other features and advantages of the present invention may be realized by providing a signal processing apparatus of an optical disk recording/reproducing apparatus, including an operational data generation unit for receiving digital signals, filtering received digital signals and outputting filtered signals as operational data, and a data arithmetic-operation unit for performing an arithmetic operation on the operational data output by the operational data generation unit in response to a command.

The signal processing apparatus may include an analog-to-digital converter for sampling analog signals and converting the sampled analog signals into the digital signals. The signal processing apparatus may include a multiplexer for selecting the analog signals to be converted into digital signals from input analog signals in response to a selection signal and outputting the selected analog signals to the analog-to-digital converter.

The data arithmetic-operation unit may be configured to generate an interrupt signal when the arithmetic operation corresponding to the command is completed, and to perform another arithmetic operation corresponding to a next command. The data arithmetic-operation unit may perform the arithmetic operation corresponding to the next command until the result of the arithmetic operation corresponding to the command is output. The data arithmetic-operation unit may start performing the arithmetic operation corresponding to the next command after the generation of the interrupt signal and may interrupt the arithmetic operation and output the result of the arithmetic operation corresponding to the command when a read signal for the result of the arithmetic operation corresponding to the command is received.

The digital signals may be servo signals.

The operational data generating unit may include a memory unit for receiving and storing the digital signals, and a digital filter for filtering the stored digital signals from the memory unit and outputting the filtered signals as operational data. The operational data generating unit may include a digital filter for filtering and outputting digital signals, and a memory unit for storing the filtered signals and outputting the filtered signals as the operational data.

The arithmetic operation may include a first arithmetic operation and a second arithmetic operation, the data arithmetic-operation unit may be configured to start the second arithmetic operation before a result of the first arithmetic operation is read out. The data arithmetic-operation unit may interrupt the second arithmetic operation to read out the result of the first arithmetic operation. The data arithmetic-operation unit may resume the second arithmetic operation after reading out the result of the first arithmetic operation.

At least one of the above and other features and advantages of the present invention may be realized by providing a signal processing method performed in an optical disk recording/reproducing apparatus, the method including generating operational data, including receiving data signals and outputting filtered data signals as operational data, and performing an arithmetic operation on the operational data in response to a command.

Generating the operational data may include filtering the received data signals, storing the filtered signals, and outputting the stored signals as the operational data. Generating the operational data may include storing the digital signals, filtering the stored signals, and outputting the filtered signals as the operational data.

The signal processing method may include sampling analog signals and converting the sampled analog signals into the digital signals. The signal processing method may include selecting the analog signals to be converted into digital signals from input analog signals in response to a selection signal and outputting the selected analog signals to be sampled.

An interrupt signal may be generated when the arithmetic operation corresponding to the command is completed, and another arithmetic operation corresponding to a next command may be performed. The arithmetic operation corresponding to the next command may be performed until the result of the arithmetic operation corresponding to the command is output after the generation of the interrupt signal. The arithmetic operation corresponding to the next command may start after the generation of the interrupt signal, and when a read signal for the result of the arithmetic operation corresponding to the command is received, the arithmetic operation corresponding to the next command may be interrupted and the result of the arithmetic operation corresponding to the command may be output.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF THE INVENTION

Figure 1:
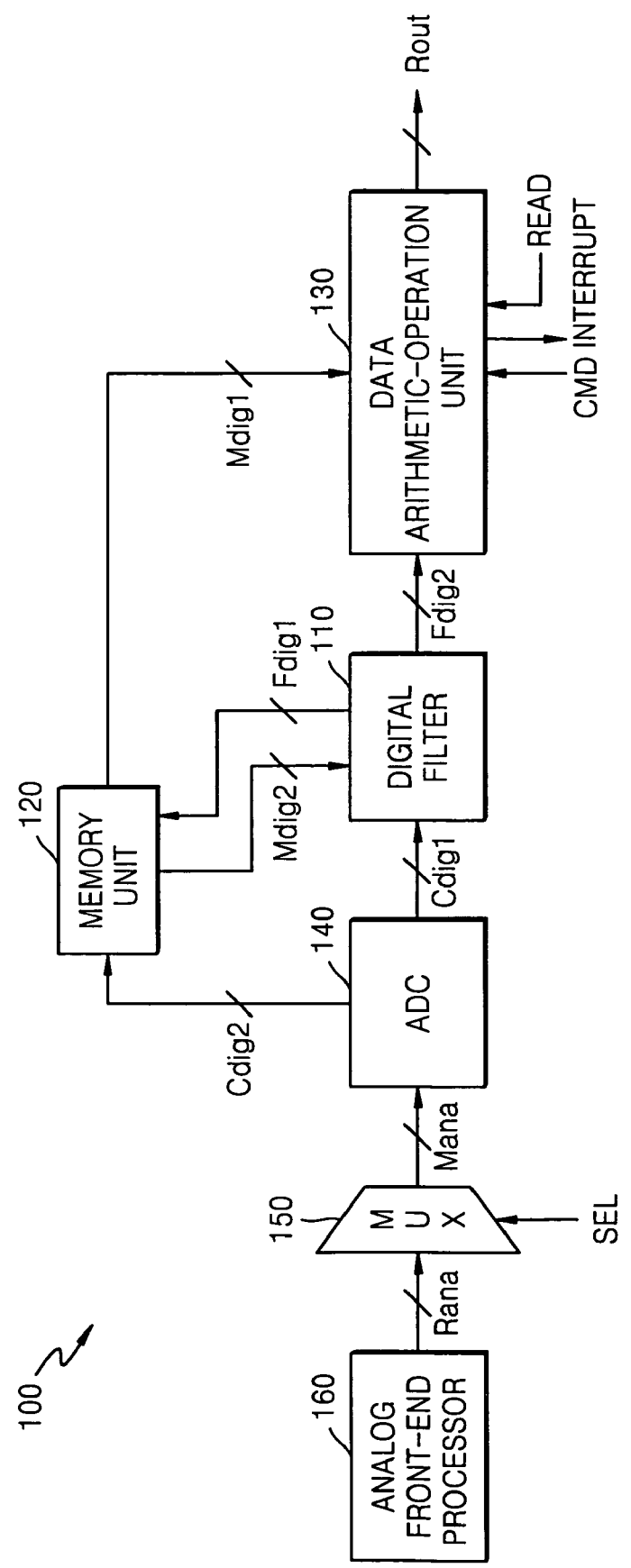
FIG. 1 illustrates a block diagram of a signal processing apparatus for an optical disk recording/reproducing apparatus, according to an embodiment of the present invention.

Korean Patent Application No. 10-2005-0083580, filed on Sep. 08, 2005, in the Korean Intellectual Property Office, and entitled: "Apparatus and Method of Processing Signals of Optical Disk Recording/Reproducing Apparatus," is incorporated by reference herein in its entirety.

The present invention will now be described more fully hereinafter with reference to the accompanying drawings, in which exemplary embodiments of the invention are illustrated. The invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

FIG. 1 illustrates a block diagram of a signal processing apparatus 100 for an optical disk recording/reproducing apparatus, according to an embodiment of the present invention. Referring to FIG. 1, the signal processing apparatus 100 may include a digital filter 110, a memory unit 120, and a data arithmetic-operation unit 130. The digital filter 110 and the memory unit 120 may together form an operational data generation unit that provides filtered data as operational data to the data arithmetic-operation unit 130.

In a first exemplary flow, the digital filter 110 may receive digital signals Cdig1, and may filter a necessary frequency band out of the digital signals Cdig1. The digital filter 110 may be a low-pass filter (LPF), a high-pass filter (HPF), or a band-pass filter (BPF) according to the type of necessary frequency band. The frequency bandwidth of the digital filter 110 may be controlled as needed.

The memory unit 120 may receive output signals Fdig1 from the digital filter 110 and may store values of the output signals Fdig1 as operational data Mdig1.

The data arithmetic-operation unit 130 may read the output signals Mdig1 from the memory unit 120, may execute an arithmetic operation on the output signals Mdig1 according to a received command CMD, and may output an operation result Rout. The data arithmetic-operation unit 130 may receive a sampling time period from a timer and execute an arithmetic operation corresponding to the command CMD (hereinafter, referred to as a first arithmetic operation) on the operational data Mdig1 during the sampling time period.

When the first arithmetic operation is completed, the data arithmetic-operation unit 130 may generate an interrupt signal INTERRUPT and may receive the next command CMD to execute an arithmetic operation corresponding to the received command (hereinafter, referred to as a second arithmetic operation). When receiving a read signal READ for the result of the first arithmetic operation during the second arithmetic operation, the data arithmetic-operation unit 130 may stop the second arithmetic operation and output the result of the first arithmetic operation.

The signal processing apparatus 100 may further include a multiplexer (MUX) 150 and an analog-to-digital converter (ADC) 140.

For convenience of explanation, FIG. 1 further shows an analog front-end processor 160. The analog front-end processor 160 is a signal processor which is the last component in an analog signal processing region.

In response to a selection signal SEL, the MUX 150 may select analog signals Mana to be converted into digital signals from analog signals Rana received from the analog front-end processor 160 and may output the selected analog signals Mana to the ADC 140. In other words, the MUX 150 may select analog signals Mana to be processed by the signal processing apparatus 100 from the analog signals Rana output from the analog signal processing region. This may increase the flexibility of the signal processing apparatus 100.

The MUX 150 may be connected to all of the analog signals Rana received from the analog front-end processor 160. The ADC 140 may convert the analog signals Mana into digital signals Cdig1.

As described above, a general signal processing apparatus has problems in that a micro-controller unit may have to process a large amount of calculation, may require many source codes to implement the micro-controller unit, and other operations may not be performed during the sampling of signals.

However, the signal processing apparatus 100 in accordance with an exemplary embodiment of the present invention may include the digital filter 110 implemented as hardware and the data arithmetic-operation unit 130 which performs an arithmetic operation on data. The digital filter 110 may filter out to-be-measured signals. The data arithmetic-operation unit 130 may perform an arithmetic operation on the filtered data.

In other words, the digital filter 110 and the data arithmetic-operation unit 130 of the signal processing apparatus 100 may share the role of the micro-controller unit of the general signal processing apparatus. Hence, to implement the signal processing apparatus 100 in accordance with the present invention, many source codes may not be needed. Furthermore, while carrying out an arithmetic operation on specific signals, the signal processing apparatus 100 may sample and filter other signals. Consequently, measurement and an arithmetic operation on several signals may be simultaneously performed.

In a second exemplary flow, the signal processing apparatus 100 may output the operation result Rout in accordance with the following example. Referring to FIG. 1, the ADC 140 may sample the analog signals Mana, convert the same into the digital signal Cdig2, and output the digital signals Cdig2 to the memory unit 120. The memory unit 120 may store the digital signals Cdig2 as operational data Mdig2. The digital filter 110 may filter the operational data Mdig2 received from the memory unit 120. The data arithmetic-operation unit 130 may perform an arithmetic operation on the operational data Fdig2 output from the digital filter 110.

Thus, in either exemplary flow, the digital filter 110 reduces an amount of data to be processed by the data arithmetic operation unit 130.

Figure 2:
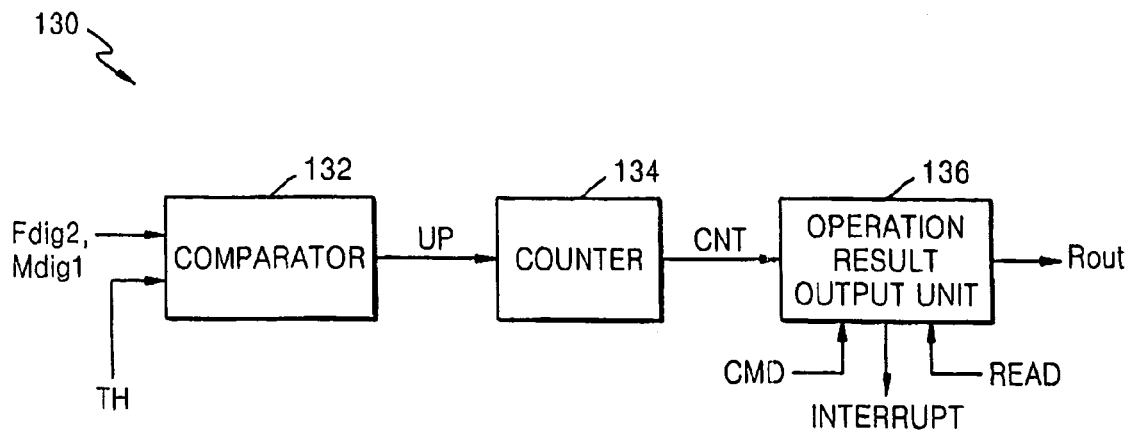
FIG. 2 illustrates a block diagram of an exemplary embodiment of a data arithmetic-operation unit shown in FIG. 1, which performs an operation of calculating the frequency of events.

FIG. 2 illustrates an exemplary embodiment of a block diagram of a data arithmetic-operation unit shown in FIG. 1. The data arithmetic-operation unit 130 of FIG. 2 may calculate the frequency of events or other arithmetic operations. Here, an event denotes the case where a signal value exceeds a predetermined threshold value. The data arithmetic-operation unit 130 may calculate the frequency of events by comparing the operational data Fdig2 (or Mdig1, according to the first exemplary flow) with a threshold value TH.

Referring to FIG. 2, the data arithmetic-operation unit 130 may include a comparator 132, a counter 134, and an operation result output unit 136. The comparator 132 may compare the operational data Fdig2 (Mdig1) with the threshold value TH and may output a result of the comparison as an up signal UP. When the operational data Fdig2 (Mdig1) is smaller than the threshold value TH, the comparator 132 may not output an up signal UP.

The counter 134 may accumulate up signals UP during a predetermined period of time and may output a result of the accumulation as a counting value CNT. That is, the output of the counter 134 may indicate the number of times the operational data Fdig2 (Mdig1) exceed the threshold value TH during the predetermined period of time.

The operation result output unit 136 may start an operation of calculating the frequency of events in response to a command CMD, and may output the operation result Rout in response to a read signal READ for the operation result Rout. In more detail, the operation result output unit 136 may output the number of times the operational data Fdig2 (Mdig1) exceed the threshold value TH as an operation result Rout. The operation result output unit 136 may also output an interrupt signal INTERRUPT indicating occurrence of an event, when the number of times the operational data Fdig2 (Mdig1) exceed the threshold value TH is greater than a reference value. The reference value may be a value pre-stored in the operation result output unit 136 and may vary as needed.

The data arithmetic-operation unit 130 may be used in seek control of an optical disk recording/reproducing apparatus. The seek control denotes a pickup's tracking on a target track to/from which data is recorded/reproduced.

The optical disk recording/reproducing apparatus may generate a tracking error control signal in response to a tracking error signal TE (see FIG. 3) and may move the pickup according to the tracking error control signal, thereby performing seek control.

Even when the seek control is completed, a tracking error may remain. In this case, the signal processing apparatus 100 may execute an arithmetic operation on the number of times the operational data Fdig2 (Mdig1) exceed the threshold value TH and may output a result of the arithmetic operation. The optical disk recording/reproducing apparatus may perform seek control using the number of times the value of the tracking error signal TE exceeds the threshold value TH.

Figure 3:
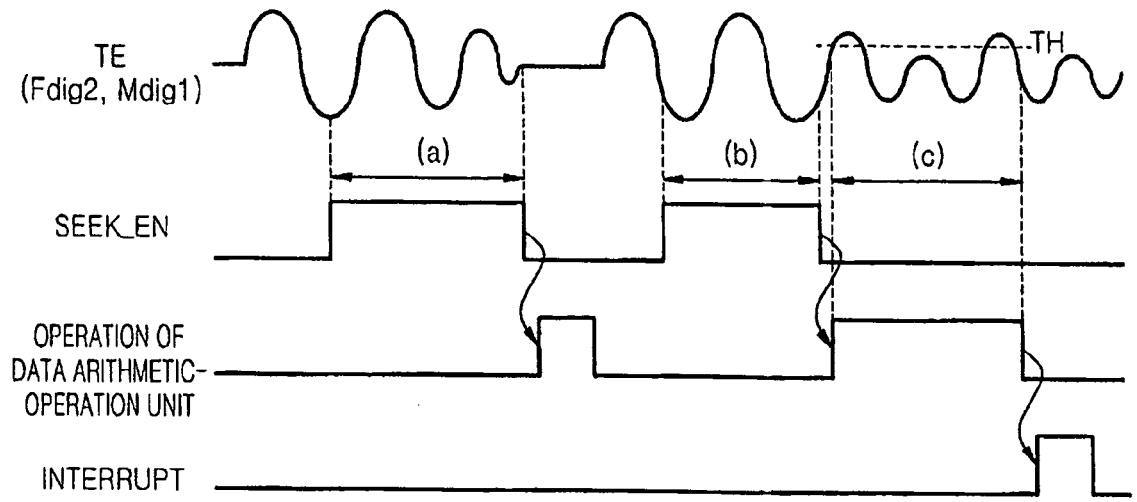
FIG. 3 illustrates a timing diagram of processing of a tracking error signal by the data arithmetic-operation of FIG. 2.

FIG. 3 illustrates a timing diagram of processing of the tracking error signal TE by the data arithmetic-operation 130 of FIG. 2. Referring to FIG. 3, the optical disk recording/reproducing apparatus may perform a seek control while a seek control enable signal SEEK_EN is logic high. After the seek control is completed, the data arithmetic-operation unit 130 of the signal processing apparatus 100 may operate.

After a seek control is performed during a period (a), the tracking error signal TE does not appear. In this case, the data arithmetic-operation unit 130 confirms that no tracking error signals TE appear, and does not perform an arithmetic operation.

On the other hand, after a seek control is performed during a period (b), the tracking error signal TE is present. In this case, the data arithmetic-operation unit 130 may perform an arithmetic operation to calculate the number of times the value of the tracking error signal TE exceeds the threshold value TH during a period (c). After the arithmetic operation is completed by the data arithmetic-operation unit 130, an interrupt signal INTERRUPT may be output.

Since the arithmetic operation of the data arithmetic-operation unit 130 used to calculate the number of times the value of the tracking error signal TE exceeds the threshold value TH may be similar to the above-described operation of calculating the number of events, a description thereof will not be repeated.

The signal processing apparatus 100 may perform operations, e.g., calculating a maximum value, a minimum value, and an average value of a signal, and calculating a droop rate.

When calculating a maximum or minimum value of a signal, the digital filter 110 may filter signal values received during a predetermined period of time, the memory unit 120 may store a result of the filtering, and the data arithmetic-operation unit 130 may compare the operational data Mdig1 stored in the memory unit 120 with each other to output the maximum or minimum value. The operation of calculating an average value of a signal is similar to the operation of calculating the maximum or minimum value of a signal.

The droop rate denotes a percentage by which a signal value increases or decreases. The data arithmetic-operation unit 130 may calculate a droop rate by calculating a change in the operational data Mdig1 stored in the memory unit 120.

Since it will be understood by one of ordinary skill in the art that the signal processing apparatus 100 may perform various operations other than the above-described operations, a detailed description of the various operations will be omitted.

The aforementioned signals may be servo signals. In other words, the signal processing apparatus 100 may receive servo signals, sample and filter the servo signals during a particular period of time using the digital filter 110, and execute an arithmetic operation on the filtered servo signals using the data arithmetic-operation unit 130. The signal processing apparatus 100 also may perform a servo control operation, e.g., automatically adjusting the servo signals using the result of the arithmetic operation, moving a beam spot onto a target track, and controlling the beam spot to track.

Figure 4:
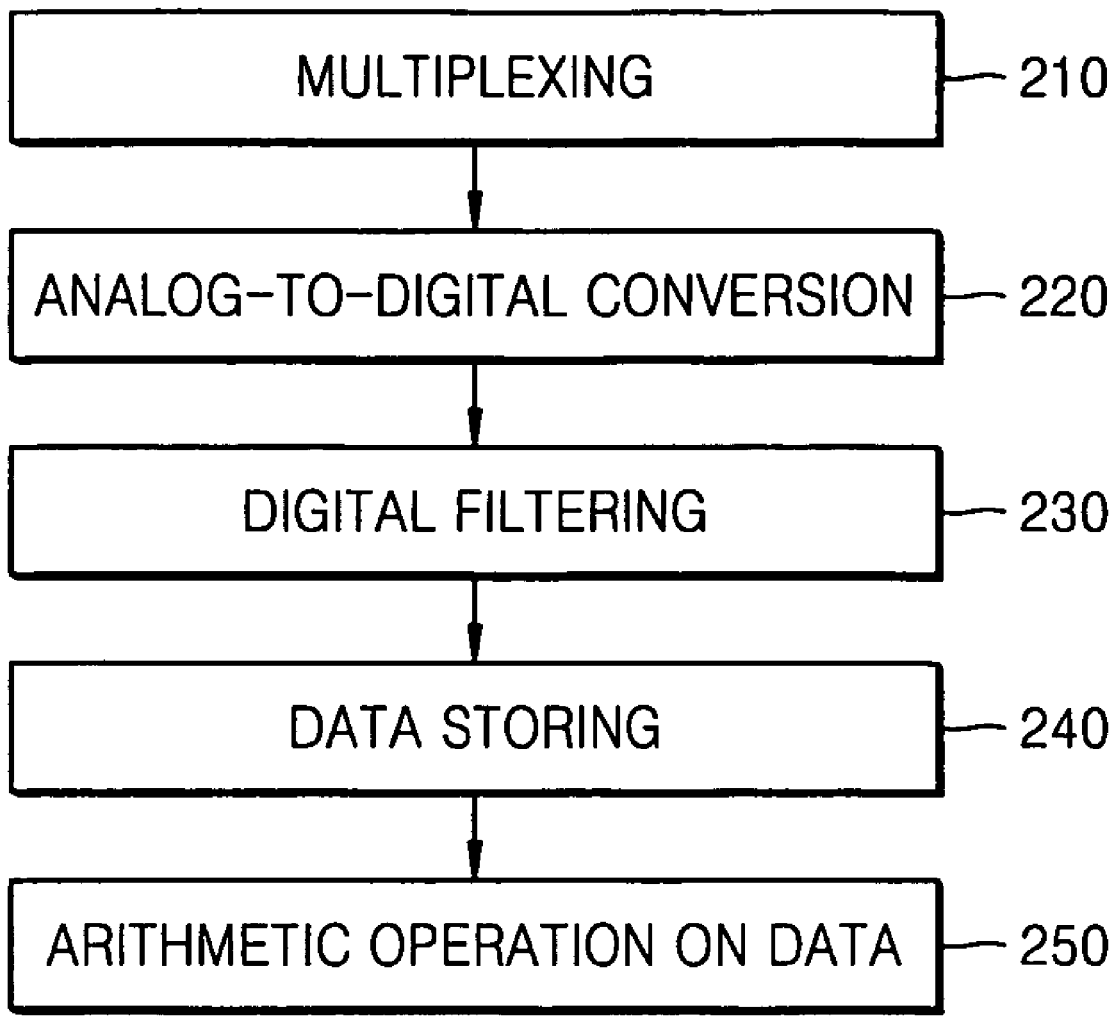
FIG. 4 illustrates a flowchart of a signal processing method performed in the optical disk recording/reproducing apparatus of FIGS. 1 through 3, according to an embodiment of the present invention.

FIG. 4 illustrates a flowchart of a signal processing method performed in the optical disk recording/reproducing apparatus of FIGS. 1 through 3, according to an embodiment of the present invention. Referring to FIG. 4, the signal processing method may include a step 230 of filtering digital signals, a step 240 of storing filtered signal values as operational data, and a step 250 of performing an arithmetic operation on the stored operational data in response to a command. Of course, the steps 230 and 240 may be reversed, as described above with reference to the second operational flow discussed above.

The signal processing method may further include a multiplexing step 210 of selecting analog signals to be converted into digital signals from the analog signals in response to a selection signal, and a step 220 of sampling the selected analog signals and converting the sampled analog signals to the digital signals.

The signal processing method may include operations similar to those described above for the signal processing apparatus 100 and thus can be understood from the above-description. Thus, the description of the signal processing method will not be repeated herein except for the step 250.

Figure 5:
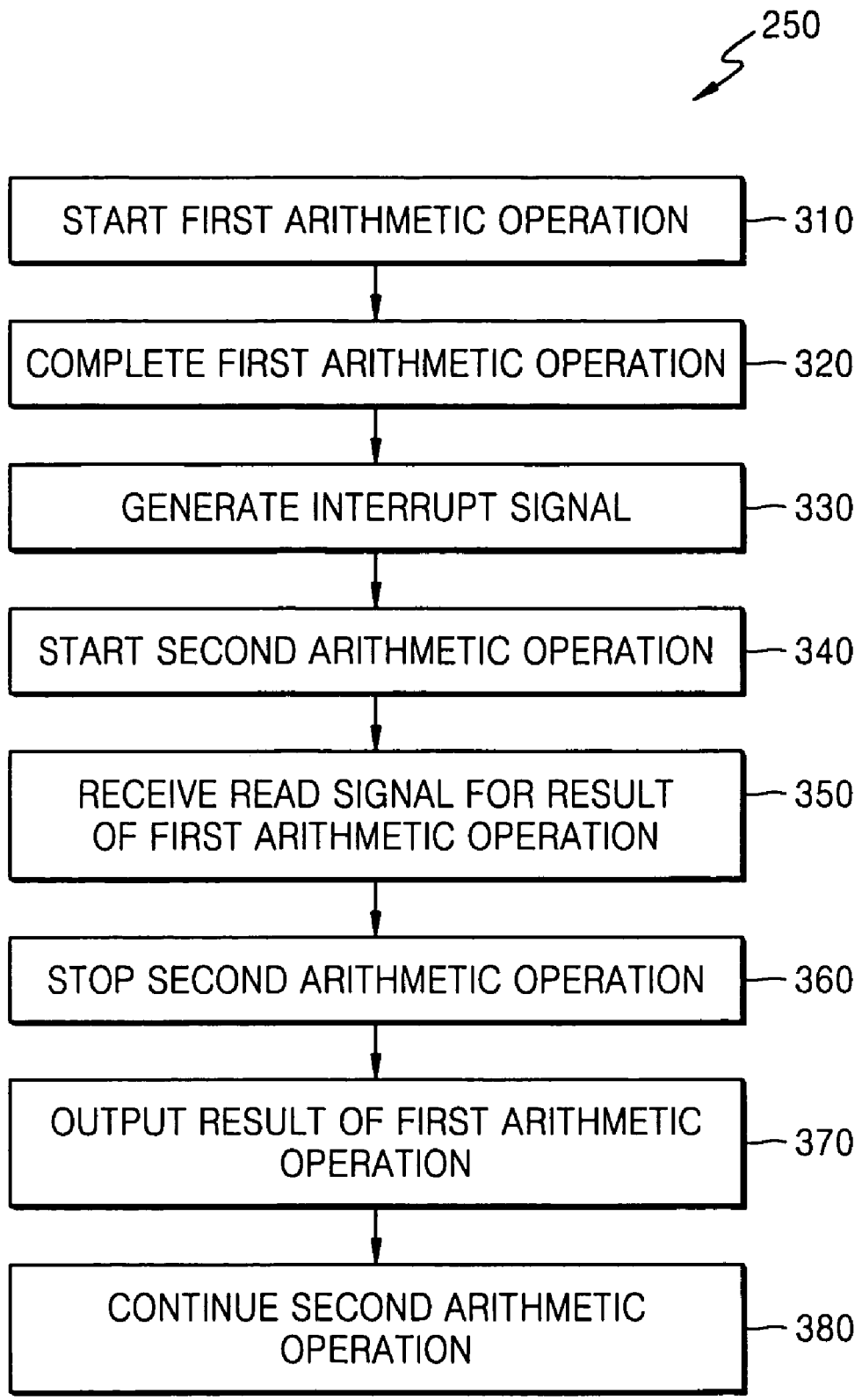
FIG. 5 illustrates a flowchart of a data arithmetic-operation operation 250 of FIG. 4.

FIG. 5 illustrates a flowchart of the data arithmetic-operation operation 250. Referring to FIG. 5, first, in a step 310, an arithmetic operation corresponding to a command (hereinafter, referred to as a first arithmetic operation) may start in response to the command. When the first arithmetic operation is completed in a step 320, an interrupt signal indicating the completion of the first arithmetic operation may be generated, in a step 330.

Thereafter, in a step 340, an arithmetic operation corresponding to a next command (hereinafter, referred to as a second arithmetic operation) may start before a result of the first arithmetic operation is read out.

When receiving a read signal for the result of the first arithmetic operation during the second arithmetic operation in a step 350, the second arithmetic operation is stopped, in a step 360, and the result of the first arithmetic operation is output in response to the read signal for the result of the first arithmetic operation, in a step 370. Thereafter, in a step 380, the second arithmetic operation continues.

After the second arithmetic operation is completed, another data arithmetic-operation operation 250 may start with operation 310.

As described above, in a signal processing apparatus and method in an optical disk recording/reproducing apparatus according to the present invention, a digital filter and a data arithmetic-operation unit share the role of a micro-controller unit of a general signal processing apparatus.

In addition, the signal processing apparatus and method does not require a lot of source codes.

Furthermore, in the signal processing apparatus and method, measurement and an arithmetic operation on several signals can be simultaneously performed by sampling and filtering other signals during an arithmetic operation on particular signals.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A signal processing apparatus of an optical disk recording/reproducing apparatus, comprising:
an operational data generation unit for receiving digital signals, filtering received digital signals and outputting filtered signals as operational data; and
a data arithmetic-operation unit for performing an arithmetic operation on the operational data output by the operational data generation unit in response to a command, wherein:
the data arithmetic-operation unit is configured to generate an interrupt signal when the arithmetic operation corresponding to the command is completed, and to perform another arithmetic operation corresponding to a next command until the result of the arithmetic operation corresponding to the command is output, and the data arithmetic-operation unit starts performing the arithmetic operation corresponding to the next command after the generation of the interrupt signal and interrupts the arithmetic operation and outputs the result of the arithmetic operation corresponding to the command when a read signal for the result of the arithmetic operation corresponding to the command is received.

2. The signal processing apparatus as claimed in claim 1, further comprising an analog-to-digital converter for sampling analog signals and converting the sampled analog signals into the digital signals.

3. The signal processing apparatus as claimed in claim 2, further comprising a multiplexer for selecting the analog signals to be converted into digital signals from input analog signals in response to a selection signal and outputting the selected analog signals to the analog-to-digital converter.

4. The signal processing apparatus as claimed in claim 1, wherein the digital signals are servo signals.

5. The signal processing apparatus as claimed in claim 1, wherein the operational data generating unit comprises:
a memory unit for receiving and storing the digital signals; and
a digital filter for filtering the stored digital signals from the memory unit and outputting the filtered signals as operational data.

6. The signal processing apparatus as claimed in claim 1, wherein the operational data generating unit comprises:
a digital filter for filtering and outputting digital signals; and
a memory unit for storing the filtered signals and outputting the filtered signals as the operational data.

7. The signal processing apparatus as claimed in claim 1, wherein the arithmetic operation includes a first arithmetic operation and a second arithmetic operation, the data arithmetic-operation unit configured to start the second arithmetic operation before a result of the first arithmetic operation is read out.

8. The signal processing apparatus as claimed in claim 7, wherein the data arithmetic-operation unit interrupts the second arithmetic operation to read out the result of the first arithmetic operation.

9. The signal processing apparatus as claimed in claim 8, wherein the data arithmetic-operation unit resumes the arithmetic operation corresponding to the next command after reading out the result of the arithmetic operation corresponding to the command.

10. The signal processing apparatus as claimed in claim 1, wherein the operational data generating unit is configured to filter and store the digital signals, and to output the filtered and stored digital signals as the operational data to the data arithmetic-operation unit.

11. A signal processing method performed in an optical disk recording/reproducing apparatus, the method comprising:
generating operational data, including receiving data signals and outputting filtered data signals as operational data; and
performing an arithmetic operation on the operational data in response to a command, wherein performing of the arithmetic operation on the operational data includes:
generating an interrupt signal when the arithmetic operation corresponding to the command is completed, and another arithmetic operation corresponding to a next command is performed, and
starting the arithmetic operation corresponding to the next command after the generation of the interrupt signal, and when a read signal for the result of the arithmetic operation corresponding to the command is received, the arithmetic operation corresponding to the next command is interrupted and the result of the arithmetic operation corresponding to the command is output.

12. The signal processing method as claimed in claim 11, wherein generating the operational data comprises:
   filtering the received data signals;
   storing the filtered signals; and
   outputting the stored signals as the operational data.

13. The signal processing method as claimed in claim 11, wherein generating the operational data comprises:
   storing the digital signals;
   filtering the stored signals; and
   outputting the filtered signals as the operational data.

14. The signal processing method as claimed in claim 11, further comprising sampling analog signals and converting the sampled analog signals into the digital signals.

15. The signal processing method as claimed in claim 14, further comprising selecting the analog signals to be converted into digital signals from input analog signals in response to a selection signal and outputting the selected analog signals to be sampled.

16. The signal processing method as claimed in claim 11, wherein in the performing of the arithmetic operation on the operational data, the arithmetic operation corresponding to the next command is performed until the result of the arithmetic operation corresponding to the command is output after the generation of the interrupt signal.

17. The signal processing method as claimed in claim 11, wherein generating operational data includes filtering and storing the digital signals, and then outputting the filtered and stored digital signals as the operational data for performing the arithmetic operation thereon.

* * * * *